United States Patent [19]

Ankeny et al.

[11] Patent Number: 5,421,672

[45] Date of Patent: Jun. 6, 1995

[54] MEANS AND METHOD FOR HYDRAULICALLY ISOLATING UNSATURATED ZONES IN SOIL

[75] Inventors: Mark D. Ankeny; Mark E. Burkhard, both of Albuquerque, N. Mex.

[73] Assignee: Daniel B. Stephens & Associates, Inc., Albuquerque, N. Mex.

[21] Appl. No.: 216,857

[22] Filed: Mar. 23, 1994

Related U.S. Application Data

[63] Continuation of Ser. No. 956,605, Oct. 5, 1992, abandoned.

[51] Int. Cl.6 ............................................. B09B 5/00
[52] U.S. Cl. .................................... 405/128; 405/129; 405/52; 588/250
[58] Field of Search .................... 405/52, 53, 128, 129, 405/130, 131, 258; 588/249, 259, 250

[56] References Cited

U.S. PATENT DOCUMENTS

| | | | |
|---|---|---|---|
| 3,791,443 | 2/1974 | Burt et al. | 405/131 X |
| 4,362,434 | 12/1982 | Valiga et al. | 405/128 |
| 4,430,021 | 2/1984 | Wagner et al. | 405/129 |
| 4,745,850 | 5/1988 | Bastian et al. | 405/128 X |

*Primary Examiner*—David H. Corbin
*Attorney, Agent, or Firm*—Zarley, McKee, Thomte, Voorhees, & Sease

[57] ABSTRACT

A method and apparatus for hydraulically isolating a volume in porous unsaturated material, such as soil. Air is forced through a permeable layer of material adjacent to the volume to be hydraulically isolated. The air flow through the permeable layer creates a water potential gradient. This causes water to migrate from more saturated areas which in turn would allow hydraulic isolation of any unsaturated area.

25 Claims, 3 Drawing Sheets

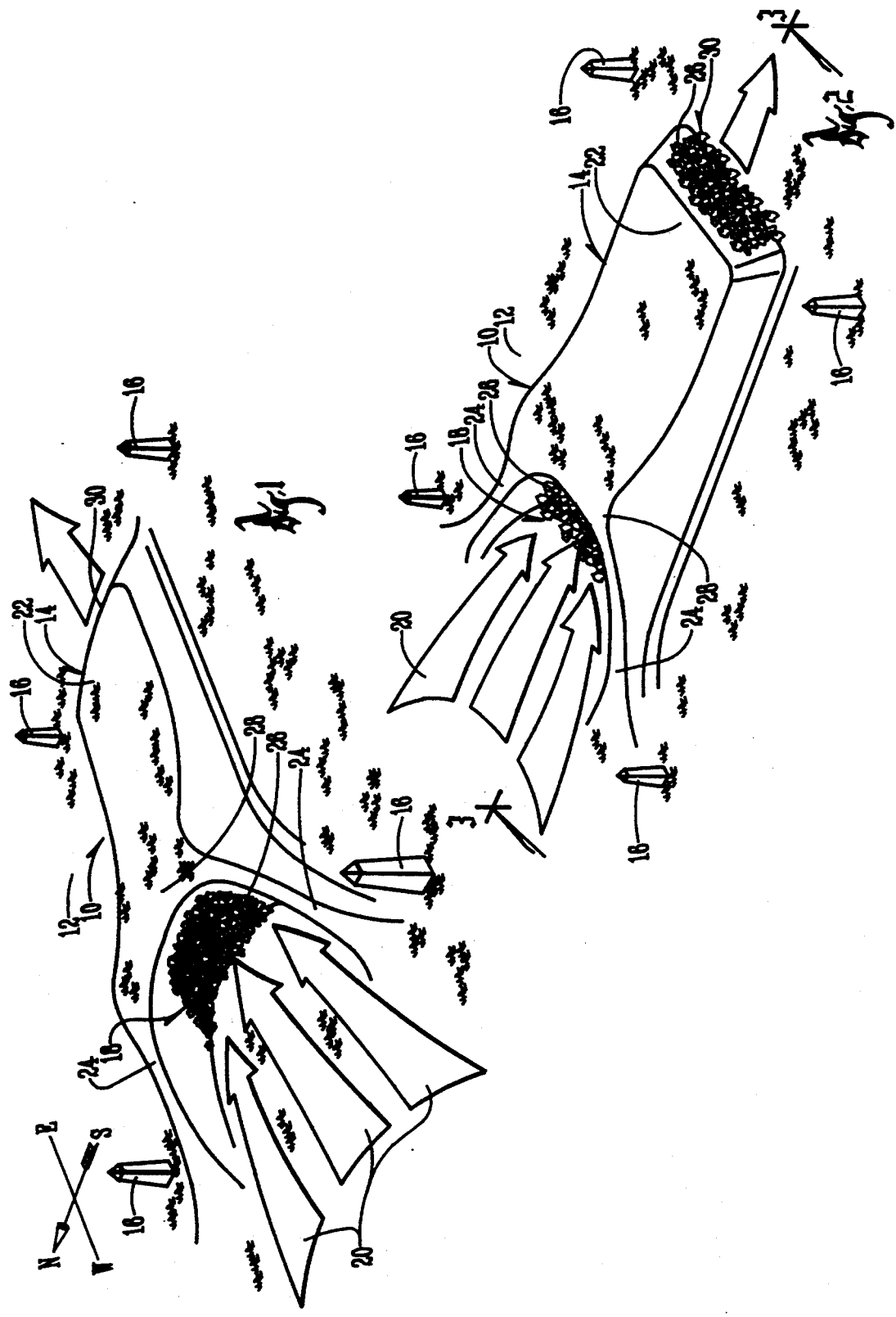

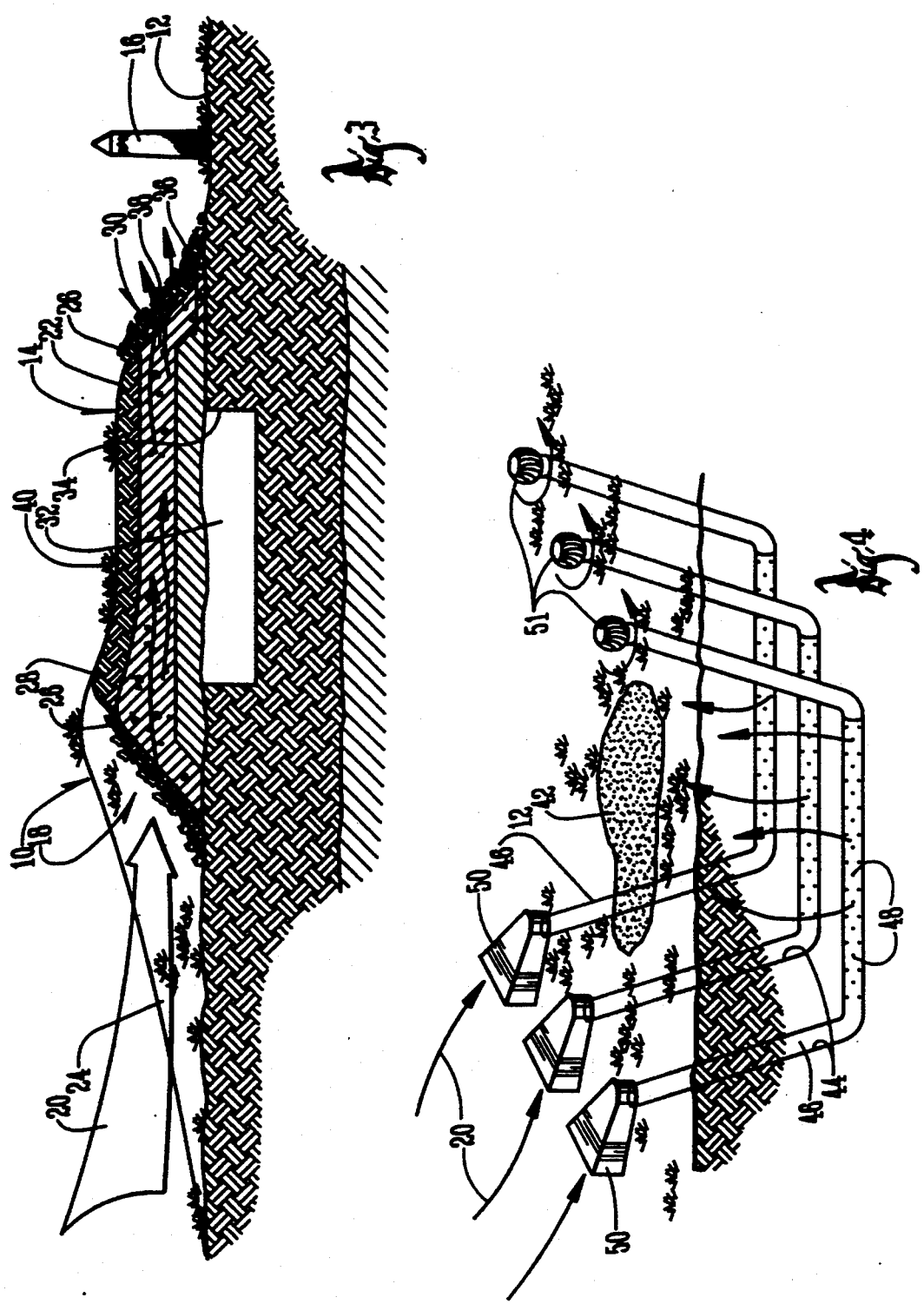

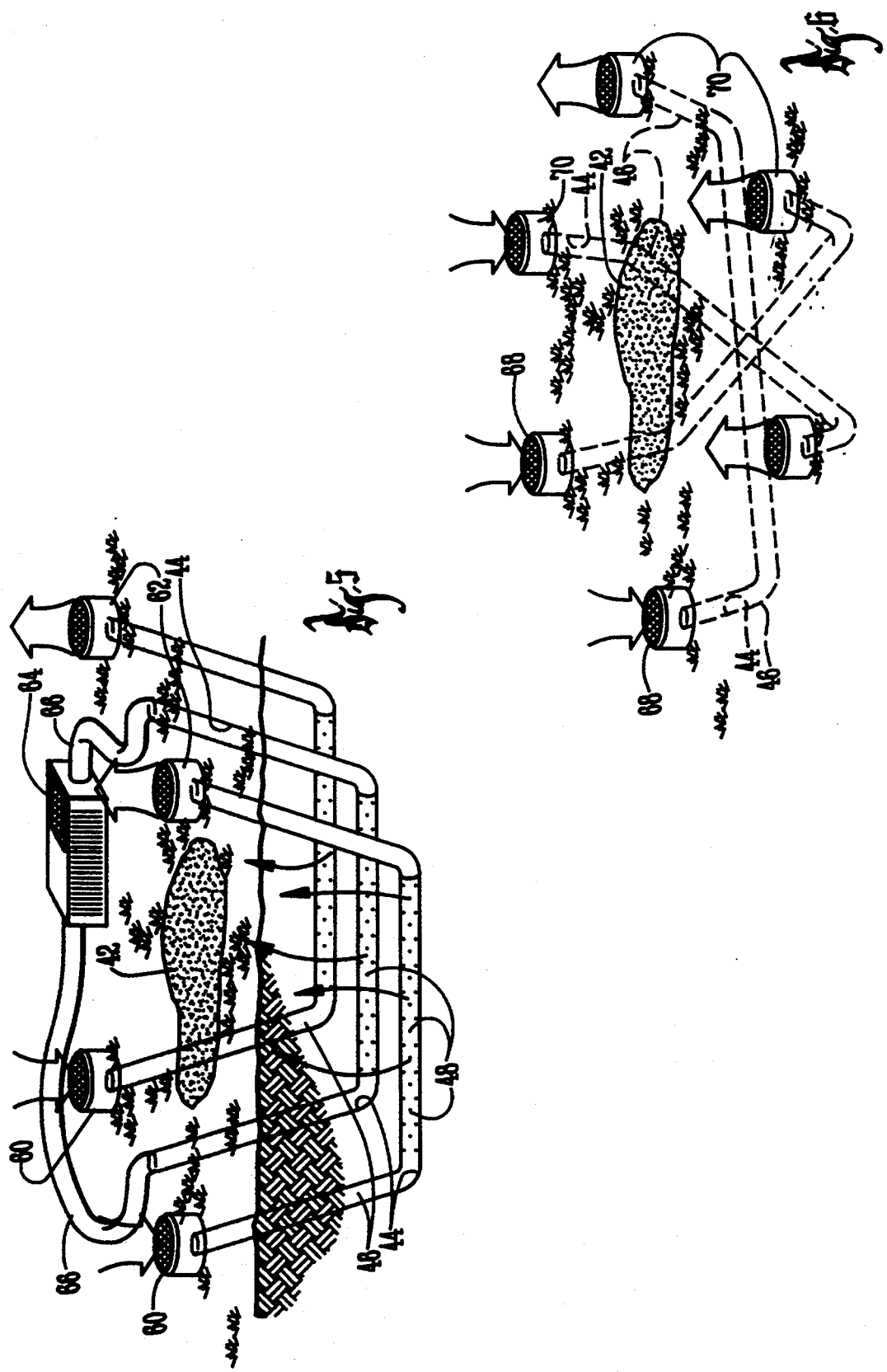

MEANS AND METHOD FOR HYDRAULICALLY ISOLATING UNSATURATED ZONES IN SOIL

This is a continuation of application Ser. No. 07/956,605, filed on Oct. 5, 1992, now abandoned.

BACKGROUND OF THE INVENTION

1. Field of the Invention

The present invention relates to manipulating hydraulic pressure gradients underneath the ground surface to in turn manipulate or isolate movement of moisture through the ground, and in particular, relates to such manipulation to improve such things as barrier systems for the long-term underground passive storage of waste materials, to contain environmentally hazardous spills in the ground, or to hydraulically isolate any given unsaturated volume in the ground.

2. Problems in the Art

Modern society has created a number of environmentally dangerous materials. Significant problems exist with respect to these materials when the materials are stored above or below ground, are accidentally spilled on the ground, or need to be stored underground. Water and moisture, because of the porosity of the layers of the ground, normally tend to migrate downwardly and can then wet and subsequently move some of these hazardous products downwardly into the water table or ground water source. This can then directly affect all living things that make use of that water source.

One example of this situation is long-term underground storage of nuclear waste. If simply buried in the ground, water from rain or other sources will partially saturate the ground above the waste. Normally the pressure gradients are such that water generally moves downwards. It therefore can move down to the waste, wet the waste, and continue to move down to the water table.

One effort to deter this from happening utilizes what is called a barrier system. The barrier system basically includes a structured cover over the buried waste to attempt to divert water laterally away from the ground above the waste.

A conventional barrier system would utilize several layers constructed above the waste. Directly above the waste is normally a fine, compacted layer of soil or clay which is intended to be virtually impervious to water. Above it would be a layer of coarse material that would be used to channel water laterally. Above the coarse layer could be top soil in which plant growth might be encouraged, or simply soil that is in turn covered by some other type of materials such as riprap to further attempt to divert water away from the area of the waste.

Barriers for nuclear waste must last thousands of years to be effective. Even the best barrier systems are subject to erosion and degradation. Over time this could result in reduction in the ability of the barrier to keep water from moving to the waste.

A real need exists, therefore, for improvements in such type of barrier systems. Obviously, these systems are cheaper than creating vaults out of cement or other expensive materials requiring costly construction, and therefore are economically attractive. Their integrity against such water supply contamination, however, can be improved.

Another situation that presents problems is if a contaminant is spilled in the ground, or a material is stored on or in the ground which has components which would be detrimental to the ground water. It is difficult, if not impossible, to isolate those types of problems in a localized area or volume of the ground.

A real need therefore exists for a way to hydraulically isolate these types of problems.

It can therefore be seen that there is a real and significant need in the art for a means and method to provide solutions or improve upon the ways now used to deal with these matters.

It is therefore a primary object in the present invention to provide a means and method for hydraulically isolating any given unsaturated zone in the soil.

Another object in the present invention is to provide a means and method as above described which hydraulically isolates a given zone or area in the ground by forcing air through the area in the ground using either a passive (wind-driven) system or a forced air system. Some applications might require an initial active system followed by a long term passive system.

Another object in the present invention is to provide a means and method as above described which can be used for a variety of different situations, for a variety of different areas, zones, and locations.

A still further object in the present invention is efficient, economical, and durable.

These and other objects, features, and advantages of the present invention will become more apparent with reference to the accompanying specification and claims.

SUMMARY OF THE INVENTION

The present invention relates to a means and method for hydraulically isolating volumes in the ground by forcing air through a dry, highly permeable layer or area of the soil or ground relative to the unsaturated volume to be isolated. The result of the air passing through this dry layer or channel of dry soil or ground is to create a water potential gradient in the porous ground compelling more saturated portions of the soil to give up moisture. Therefore, the travel of water or moisture can be controlled.

The invention therefore can be used to improve long term underground passive storage systems for hazardous materials or isolate hazardous spills in the ground or leachings from hazardous materials stored above the ground.

The forced air can be created by either passive or active systems and methods.

BRIEF DESCRIPTION OF THE DRAWINGS

FIG. 1 is a perspective diagrammatical view of a preferred embodiment of the invention applied to an underground storage barrier system.

FIG. 2 is a view similar to FIG. 1 but taken from a substantially opposite direction from FIG. 1.

FIG. 3 is a sectional view of FIG. 2 taken along line 3—3 of FIG. 2.

FIG. 4 is a diagrammatical depiction of another embodiment according to the present invention applied to isolating a spill on and into the ground by a passive system.

FIG. 5 is an elevational cross-sectional diagrammatical depiction similar to FIG. 4 but using an active system.

FIG. 6 is a plan view depiction similar to FIG. 5 showing radial distribution of conduits relative to the volume to be hydraulically isolated.

DESCRIPTION OF PREFERRED EMBODIMENT

To assist in an understanding of the invention, a detailed description of a preferred embodiment will now be set forth. Reference will be taken to the appended drawings (FIGS. 1–6). Reference numerals will be utilized in the figures and this description to identify certain parts and locations in the figures. The same reference numerals will be utilized to indicate the same parts and locations in all the drawings unless otherwise indicated.

FIG. 1 shows a long-term underground passive storage barrier system 10 according to the present invention. Normally system 10 would be constructed in a remote location. A large hole would be dug in the ground 12. Hazardous waste, for example, nuclear waste, would be placed in the hole. What is called a closure cap 14 would be placed over the hole. Many times warning markers 16 would be utilized to warn the public of the existence and content of hazardous material.

It is to be understood that these systems can be quite large. They can be several hundred feet or even yards long and wide. The closure cap 14 can be several tens of feet tall.

In the preferred embodiment of FIG. 1, the part of closure cap 14 covering the waste is rather conventionally made by utilizing layers of natural material over the location of the hazardous waste. The materials are selected and configured to attempt to move any rain water (or other moisture) laterally of the cap 14 and prevent it from moving directly down into the ground and through the waste material, and/or to collect the water and let it evaporate back to the atmosphere.

In the preferred embodiment of FIG. 1, the closure cap 14 includes an opening 18 which faces prevailing winds indicated by arrows 20. Cap 14 around opening 18 is taller than opposite end 22, and also includes side walls or wings 24 extending obliquely outwardly from opening 18.

Opening 18 is filled with large rocks or riprap 26. A combination of side walls 24, and what will be called bluff 28 (the higher end of cap 14), serves to capture and then funnel wind into opening 18.

FIG. 2 reveals that system 10 also has an exit 30 at opposite end 22. Exit 30 is also filled with rocks 26 and serves to be an exhaust for wind 20. Wind 20 can then serve to dry (and maintain dry) the interior of the cap 14. Wind 20 is collected and funneled into large opening 18 and exhausted through smaller exit 30. It creates essentially a wind-driven air flow through cap 14. Air is pushed and pulled through cap 14 by the configuration to maximize air flow through a zone in the cap 14. This is called a passive system because it relies on the wind and the structure of the system 10 to function.

FIG. 3 illustrates the interior of cap 14. Waste 32 sits in cavity 34 below the surface of ground 12. A first layer 36, immediately over waste 32 is comprised of a mixture of fine clay particles which are compacted to present a layer which tends to be impervious to water or at least tends to divert water laterally. A layer 38 on top of layer 36 consists of coarser particles such as gravel which is conducive or permeable to the flow of water. Layer 40 above layer 38 simply is top soil. As can be seen, layer 38 extends across and through cap 14 from entrance opening 18 to exit opening 30. Layer 38 not only functions to divert water laterally to both sides of layer 36, but also is permeable to the air flow generated by wind 20 and the structure of system 10.

That combination serves to dry any moisture getting into layer 38 through top soil 40 to further reduce any chance of moisture traveling to or near waste 32, and then traveling down to the water table which would be below an unsaturated zone in the ground. It also sets up a pressure gradient conducive to deterring water from traveling to waste 32.

By drying cap 14, an upward water potential gradient is created above the stored waste 42. Because air is at a low potential, the water potential gradient from waste 42 is upward and not downward towards the water table. The potential can be lowered to such an extent that movement of waste in the liquid phase, because of water or moisture reaching the waste 32, is made more improbable.

Operation of the embodiment of the invention in FIGS. 1–3 can be described as follows. In the northern hemisphere, for example, there are generally prevailing westerly winds. Opening 18 should therefore be oriented towards the prevailing winds. As wind blows against side wings 24 and bluff 28, the air pressure along the windward or wind facing side increases due to form-drag (or bluff) effect. At the downstream side (or crest) of system 10, air pressure decreases due to an airfoil effect. When a pressure gradient is imposed on a porous material, fluid flow results. Familiar examples include winds in downtown areas near tall building and airplane wings. By facing the "wind scoop" in the direction of the prevailing winds and shaping the scoop to maximize the form-drag affect, a positive air pressure is induced on the windward faces of side wings 24 and bluff 28. By similar design of the crest or downstream side, a zone of low air pressure can be created. Cap 10 is then designed to allow air flow from high/low pressure underneath the surface of cap 14. Layer 38 is a continuous permeable gravel layer exposed on both the windward and leeward side of barrier system 10. In the preferred embodiment, the permeable layer could be protected on the surface with riprap.

The wind scoop shape could be optimized based on modeling. It is preferable that the general shape would be a curved area with impermeable wings 24 funneling air to the permeable gravel layer 38 in the center. The crest or opposite end 22 design would likely be a bank of riprap covered fill near its angle of repose.

The funneled air through system 10 would dry adjacent layers of the barrier. Air, at low water potential, creates conditions that assure the water potential gradient from the waste is upward and not downward towards the water table.

FIG. 4 depicts an alternative embodiment of the present invention. In the example of an oil spill 42 in ground 12, channels 44 could be drilled first down and then across underneath the oil spill 42. Channels 44 could be completed by then drilling upwardly to the surface on the opposite side of spill 42, or drilling down from the opposite side to meet the partially drilled channels. Pipes 46, containing apertures 48, could then be inserted through the channels 44. Wind scoops 50 (facing the prevailing winds) could be attached to the exposed ends of pipes 46 on one side of spill. Ventilators 51 (wind-activated) could be attached to the exposed ends of pipes 46 on the opposite side of spill 42, to assist in creating lower pressure on that end to facilitate a push-pull air flow through pipes 46, again producing wind-driven maximum air flow through the ground. FIG. 4 illustrates one combination of pushing and pulling air through a porous medium. An alternative use of the boreholes in FIG. 4 would be to create a vacuum in the middle channel and pressurize the other channels to create air flow through the entire porous layer underlying the waste materials. Such an arrangement or a radially arranged variant, thereof, would isolate the porous volume and prevent lateral redistribution of wastes. Similar to the embodiment of FIG. 1, scoops 50 would be directed towards the prevailing winds. An alternative to pipes 46 and apertures 48 would simply be to fill channels 44 with something like gravel.

In the proposed system of FIG. 1 air flow is primarily horizontal to the soil surface. The airfoil and bluff effects can be used to circulate air. In FIG. 4 air flow is through scoops 50, down boreholes 44 through a porous medium (i.e. apertured pipes 48) and back up second boreholes 44 by use of wind-driven turbines 51 (attic vent style). The system of FIG. 4 is therefore also basically passive. Various other passive wind-driven vents may also be utilized. FIGS. 1 and 4 give examples of both vertical and horizontal deployment of the system. By using directional angled drilling techniques, any intermediate angle is also achievable.

Channels 44 (the boreholes in the soil of FIG. 4) can be created by various drilling techniques. Using this system, channels could be drilled under or near virtually any landfill, tailings pile, field spill, or other contaminated site. Pipe or gravel could be laid in the drilled channels. Wind scoops and vents could be set up, and the system could dry out the subsurface which would hydraulically isolate any given unsaturated zone site.

In its simplest form, it would be possible to isolate some sites by designing a highly permeable layer as a "barrier" to liquid flow. This is in direct contrast to employing fine-textured materials of low permeability or plastic barriers of almost zero permeability to hydraulically isolate a site.

FIG. 5 is similar to FIG. 4 in that it shows a system according to the invention installed to hydraulically isolate a spill in the ground. The primary difference between the system of FIG. 5 and that of FIG. 4 is as follows. The system of FIG. 5 is what will be called an active system. Instead of relying merely on wind, which is captured and then exhausted, powered intake fans 60 are utilized to bring air in and force it through pipes 46, which like the embodiment of FIG. 4, extend through bored channels in the ground and have apertures 48. In FIG. 5, outlet fans 62 are used at the opposite ends of pipes 46 to further assist in the flow of air through pipes 46. This illustrates an active way of pressurizing pipes 46 to get air flow.

A possible optional addition to the embodiment of FIG. 5 would be to utilize a vacuum device 64 connected in a closed loop with pipe 66 (having apertures 48) to create a vacuum in pipe 66. In this sense, pipes 46 would be pressurized in a partial vacuum setup in pipe 66 to cause additional air movement in the layer surrounding the spill for the purpose of hydraulic isolation according to the invention.

FIG. 6 merely illustrates one way air inlets 68 and corresponding air outlets 70, in turn with corresponding linking pipes 46, can be disposed radially around a spill. Pipes 46 would go underneath the spill and in this pattern extend through the layer underneath and around the spill to hydraulically isolate the spill. Other configurations, of course, are possible.

It is to be understood that the active systems according to the present invention could be operated with pulsed air flow. This could be created with piston-type movement of some sort of air pump taking the place of the inlet and outlet fans of FIG. 5 or FIG. 6. Alternatively, it could be created by cycling the fans on and off or cycling some other type of pressurization or air pump on or off.

It can therefore be seen that the present invention achieves at least all of its stated objectives. The preferred embodiments described above are given by way of example only and not limitation. It will be appreciated that the present invention can take many forms and embodiments. The true essence of the spirit of this invention are defined in the appended claims, and it is not intended that the embodiments of the invention presented herein should limit the scope thereof.

What is claimed is:

1. An improved protective barrier system for passive underground storage of waste or hazardous material in at least one cavity having a length, width, and depth in the ground into which can be inserted waste or hazardous material, the protective barrier system including a closure cap generally above the ground over the length and width of the cavity which resists erosion and penetration of water and directs water away from the cavity to attempt to prevent water from moving through waste or hazardous material in the cavity and carrying waste or hazardous material or any potentially harmful by-product of the waste or hazardous material into any unsaturated layers or ground water beneath the cavity, the improvement comprising:

a layer of material which is highly air and water permeable extending generally along the length and width of the cavity between an entrance opening to and an exit opening from the layer of material; and a collection structure for collecting and directing wind into the entrance opening;

so that air can flow through the highly permeable layer, dry the interior of the highly permeable layer, and create a water potential gradient adjacent to the cavity to compel water to move away from the cavity, and where water flow is controlled by manipulation of air flow through the layer of material which is highly air and water permeable to contain liquid phase movement of water and waste or hazardous material, and to remove or stabilize water relative to the cavity.

2. The barrier system of claim 1 wherein the opening extends substantially across the cap.

3. The barrier system of claim 1 wherein the opening extends substantially the height of the cap.

4. The barrier system of claim 1 wherein the layer of relatively coarse material comprises gravel.

5. The barrier system of claim 1 wherein the exit opening is substantially across the cap.

6. The barrier system of claim 1 wherein the exit opening is generally at an opposite side of the closure cap from the entrance opening.

7. The barrier system of claim 1 wherein the collection structure comprises side walls extending outward and in opposite directions from the opening.

8. The barrier system of claim 7 wherein the side walls extend obtusely from the opening.

9. The barrier system of claim 1 wherein the collection structure is made of substantially natural materials.

10. The barrier system of claim 1 wherein the collection structure faces prevailing winds with respect to the barrier.

11. The barrier system of claim 10 wherein the collection structure includes a raised portion around the opening.

12. The barrier system of claim 11 wherein the closure cap is elongated from entrance opening to exit opening and decreases in height from the raised portion.

13. The barrier system of claim 1 wherein the waste materials include but are not limited to nuclear waste, toxic waste, hazardous waste, and environmentally hazardous waste.

14. A method of controlling air flow through a protective barrier system positioned adjacent waste materials in the ground, for passive underground storage of the waste or hazardous materials wherein the protective barrier system includes at least one cavity havinq a length, width, and depth in the ground into which can be inserted waste or hazardous material and a closure cap generally adjacent the cavity which resists erosion and penetration of water and directs water away from the cavity to attempt to prevent water from moving through waste or hazardous material and carrying waste or hazardous material or any potentially harmful by-product of waste or hazardous material into any unsaturated layers or ground water beneath the cavity comprising:

capturing wind; and directing the captured wind into, through and out of a layer of material of high permeability to water and air extending substantially adjacent to and across the waste or hazardous materials in the cavity, and controlling the containment of water, waste or hazardous material byproducts, and waste or hazardous materials the liquid phase, by manipulating air flow through the layer of material to remove water in the gas phase.

15. The method of claim 14 wherein the wind is captured by orienting a wind scoop structure towards a prevailing wind.

16. The method of claim 14 wherein the wind is captured by blocking and funneling wind into an entrance opening to the closure cap protective barrier.

17. The method of claim 14 wherein the wind is captured by blocking and funneling wind by shaping structure to create a form-drag affect at an entrance opening side to the protective barrier, and to create an airfoil affect at an exit opening side of the protective barrier so that air pressure is higher at the entrance opening side than the exit opening side.

18. A method of creating a water potential gradient in the ground for hydraulically isolating a volume in the ground containing waste or hazardous material including placing a closure cap generally adjacent the volume in the ground which resists erosion and penetration of water and directs water away from the volume in the ground to attempt to prevent water from moving through the waste or hazardous material and carrying waste or hazardous material or any potentially harmful by,product of waste or hazardous material into any unsaturated layersor ground water beneath the volume in the ground comprising:

forming a layer of material of high water and air permeability at a position near and generally across at least one side of the volume in the ground;

forming an entrance and an exit to the layer; and funneling wind into the layer;

so that higher pressure exists at the entrance and lower pressure at the exit and the wind creates an air flow through the layer in turn creating a water potential gradient in the ground, controlling the containment of liquids relative to the volume in the ground by manipulating the air flow through the layer.

19. The method of claim 18 wherein the step of forming a layer in the ground comprises drilling at least one channel in the ground and filling it with the material.

20. The method of claim 19 wherein the material comprises a coarse material.

21. A method for hydraulically isolating a volume in the ground containing waste or hazardous material including placing a closure cap generally adjacent the volume in the ground which resists water erosion and penetration of water and directs water away from the volume in the ground to attempt to prevent water from moving through waste or hazardous material in the volume in the ground and carrying waste or hazardous material or any potentially harmful by-product of waste or hazardous material into any unsaturated layers or ground water beneath the volume in the ground comprising:

forcing air through a relatively highly liquid and air permeable zone of material adjacent to the volume in the ground;

creating a liquid flow potential gradient relative to the volume in the ground; and controlling the containment of water and waste in the liquid phase relative to the volume in the ground, by manipulating air flow in the gas phase through the zone.

22. The method of claim 21 wherein the step of forcing air through the zone comprises capturing and directing wind through the zone.

23. The method of claim 22 wherein the step of forcing air through the zone comprises mechanically forcing air through the zone.

24. The method of claim 21 further comprising pressurizing said zone, and creating a partial vacuum in a second zone of highly liquid and air permeable material in the ground.

25. The method of claim 23 further comprising pulsing the mechanically forced air through the zone.

* * * * *

UNITED STATES PATENT AND TRADEMARK OFFICE
CERTIFICATE OF CORRECTION

PATENT NO. : 5,421,672
DATED : June 6, 1995
INVENTOR(S) : Ankeny et al

It is certified that error appears in the above-indentified patent and that said Letters Patent is hereby corrected as shown below:

In claim 14 at column 7, line 18, delete "havinq" and substitute -- having --.

In claim 18 at column 8, line 4, delete "by,product" and substitute -- by-product --.

Signed and Sealed this

Seventeenth Day of October, 1995

*Attest:*

BRUCE LEHMAN

*Attesting Officer*   Commissioner of Patents and Trademarks

UNITED STATES PATENT AND TRADEMARK OFFICE
CERTIFICATE OF CORRECTION

PATENT NO. : 5,421,672
DATED : Jun. 6, 1995
INVENTOR(S) : Mark D. Ankeny, et al

It is certified that error appears in the above-indentified patent and that said Letters Patent is hereby corrected as shown below:

Column 1, line 7, before the heading "Background of the Invention", please insert the following paragraph:

--GOVERNMENT RIGHTS
 The U.S. Government has a paid-up license in this invention and the right in limited circumstances to require the patent owner to license others on reasonable terms as provided for by the terms of (Grant No. DOE OTD CONTRACT DE-AC04-94AL85000) awarded by the Department of Energy.--

Signed and Sealed this

Twenty-third Day of July, 1996

Attest:

BRUCE LEHMAN

*Attesting Officer*     *Commissioner of Patents and Trademarks*